(12) United States Patent
Wagner

(10) Patent No.: US 8,003,912 B2
(45) Date of Patent: Aug. 23, 2011

(54) METHOD FOR MANUFACTURING A MACHINE HOUSING HAVING A SURFACE-HARDENED FLUID CHAMBER

(75) Inventor: Peter Wagner, Werdohl (DE)

(73) Assignee: Brinkmann Pumpen K. H. Brinkmann GmbH & Co. KG, Werdohl (DE)

( * ) Notice: Subject to any disclaimer, the term of this patent is extended or adjusted under 35 U.S.C. 154(b) by 242 days.

(21) Appl. No.: 12/301,316

(22) PCT Filed: May 29, 2008

(86) PCT No.: PCT/EP2008/004285
§ 371 (c)(1),
(2), (4) Date: Nov. 18, 2008

(87) PCT Pub. No.: WO2009/012837
PCT Pub. Date: Jan. 29, 2009

(65) Prior Publication Data
US 2010/0178518 A1     Jul. 15, 2010

(30) Foreign Application Priority Data

Jul. 24, 2007   (DE) .......................... 10 2007 034 489
Feb. 6, 2008    (DE) .......................... 10 2008 007 769

(51) Int. Cl.
*B23H 1/00*        (2006.01)
*B23H 9/00*        (2006.01)

(52) U.S. Cl. .................................. 219/69.17; 219/69.12
(58) Field of Classification Search ............... 219/69.12, 219/69.17, 69.2
See application file for complete search history.

(56) References Cited

U.S. PATENT DOCUMENTS

| 3,878,880 | A | 4/1975 | Jones |
| 3,960,577 | A | 6/1976 | Prochazka |
| 5,177,037 | A | 1/1993 | Schuldies |
| 6,005,214 | A | 12/1999 | Cramer |
| 6,233,825 | B1 * | 5/2001 | DeGroot .................... 29/896.22 |
| 6,335,503 | B1 * | 1/2002 | Tsung ........................ 219/69.17 |

FOREIGN PATENT DOCUMENTS

| DE | 2923729 A1 | 1/1980 |
| DE | 3733730 C1 | 10/1988 |
| EP | 1748192 A2 | 1/2007 |
| GB | 2150126 A | 6/1985 |
| JP | 08-229740 A | * 9/1996 |
| WO | 02096587 A2 | 12/2005 |

* cited by examiner

*Primary Examiner* — Geoffrey S Evans
(74) *Attorney, Agent, or Firm* — Richard M. Goldberg

(57) ABSTRACT

Method for manufacturing a machine housing having a fluid chamber (14) with a hardening layer (16) on an internal wall surface, in which the hardening layer (16) is made of a material, that, per-se, is not electrically conductive but has been made conductive by additives, and in that the surface of the hardening layer (16) is machined by electro-discharge machining.

10 Claims, 3 Drawing Sheets

METHOD FOR MANUFACTURING A MACHINE HOUSING HAVING A SURFACE-HARDENED FLUID CHAMBER

The invention relates to a method for manufacturing a machine housing having a fluid chamber with a hardening layer on its internal wall surface, as well as a machine having a housing manufactured in accordance with this method.

In machines, e.g. pumps, internal combustion engines and the like, which have a fluid chamber in which a piston, an impeller, a screw-spindle or any other insert is moving, the internal wall of the fluid chamber is exposed to a substantial wear where it is in frictional contact with the insert. It has therefore become known to form a hardening layer on the internal surface of the wall of the fluid chamber, e.g. by gluing-in a shell made of wear resistant ceramics, typically silicon carbide.

In order for the contour of the fluid chamber to be precisely matched to the geometry of the insert, it is necessary to finish the chamber walls by grinding. Due to the hardness of the silicon carbide layer, however, this finishing process is labor intensive and therefore costly.

It is accordingly an object of the invention to provide a machine of the type indicated above which can be manufactured more easily, and to provide a method for manufacturing the housing of such a machine.

This object is achieved with the features indicated in the independent claims. Useful further developments of the invention will be understood from the dependent claims.

The method for manufacturing the machine housing has the particular feature that the hardening layer is made of a material that, per-se, is not electrically conductive, but is made electrically conductive by suitable additives, and that the surface of the hardening layer is machined by electro-discharge machining (EDM).

By making the hardening layer electrically conductive, the electro-discharge machining is made possible, so that the desired contour can be formed by electric erosion with high precision and in a largely automated process.

For electro-discharge machining, all known erosion processes such as wire EDM, die sinking EDM and the like can be used, so that the known advantages of these processes can also be utilized in the framework of the invention. In particular, methods and apparatus for an automatic change of the erosion wire or the erosion electrode have become known, so that the process may largely be automated even for large numbers of workpieces. Moreover, thanks to the flexibility of the erosion process there are hardly any limitations as regards the geometry of the fluid chambers.

A suitable material for the electrically conductive hardening layer is conductive silicon carbide, that is offered for example by the company Schunk Ingenieurtechnik, Willich, Germany.

A machine according to the invention is characterized in that the hardening layer consists of the conductive silicon carbide.

For the purposes of electro-discharge machining, the conductive hardening layer must be contacted electrically. This may for example be achieved by gluing the hardening layer, which has been formed as a separate shell, into the blank of the machine housing by means of an electrically conductive glue. Then, the electrically conductive connection is achieved via electric contracts or terminals that are externally provided on the metal machine housing. Optionally, the hardening layer may also be contacted by means of an electrically conductive clamping bow that is clampingly held at the machine housing.

An embodiment example of the invention will now be explained in conjunction with the drawing, wherein.

Figure 1:
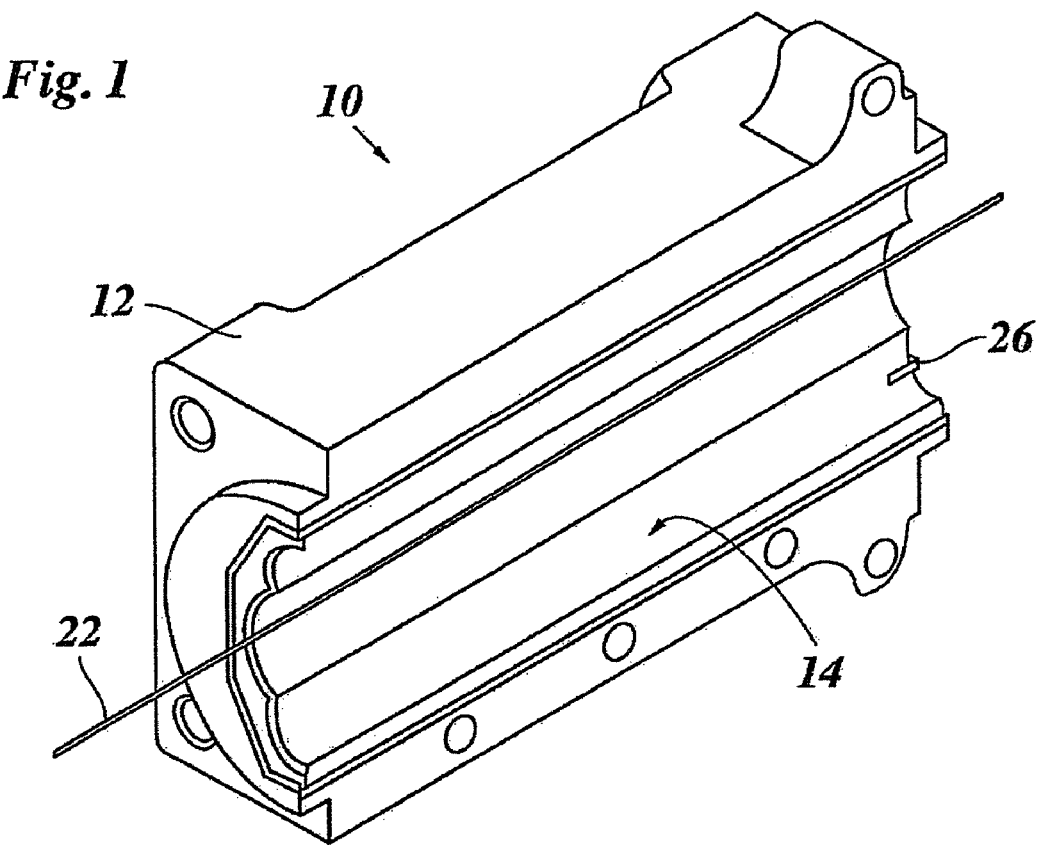
FIG. 1 is a broken-away perspective view of a machine housing to which the invention is applicable.

In FIG. 1, one half of a machine housing 10 has been shown, e.g. the housing of a screw-spindle pump or a screw-spindle compressor.

Figure 2:
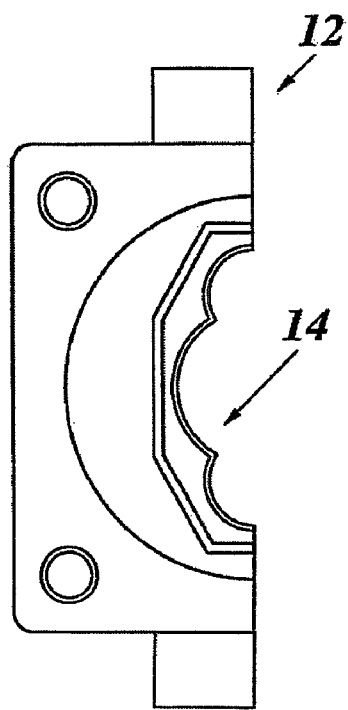
FIG. 2 is a front view of one half of the housing according to FIG. 1.

Two complementary half shells 12 of the housing 10 are formed by metal casting and are then joined to form the complete housing and are connected to one another by means of bolts, for example. FIGS. 1 and 2 show only one of the two half shells. Internally of the housing 10, a fluid chamber 14 is formed that passes through on the entire length and has a uniform cross-section on its entire length. As can more clearly be seen in FIGS. 2 and 3, the cross-section of the fluid chamber 14 is formed by three overlapping circles the central one of which has a larger diameter than the two other circles. In the completed screw-spindle pump, this fluid chamber will accommodate three parallel screw-spindles that mesh with one another and the outer perimeters of which correspond respectively to the three circles of the cross-section.

Figure 3:
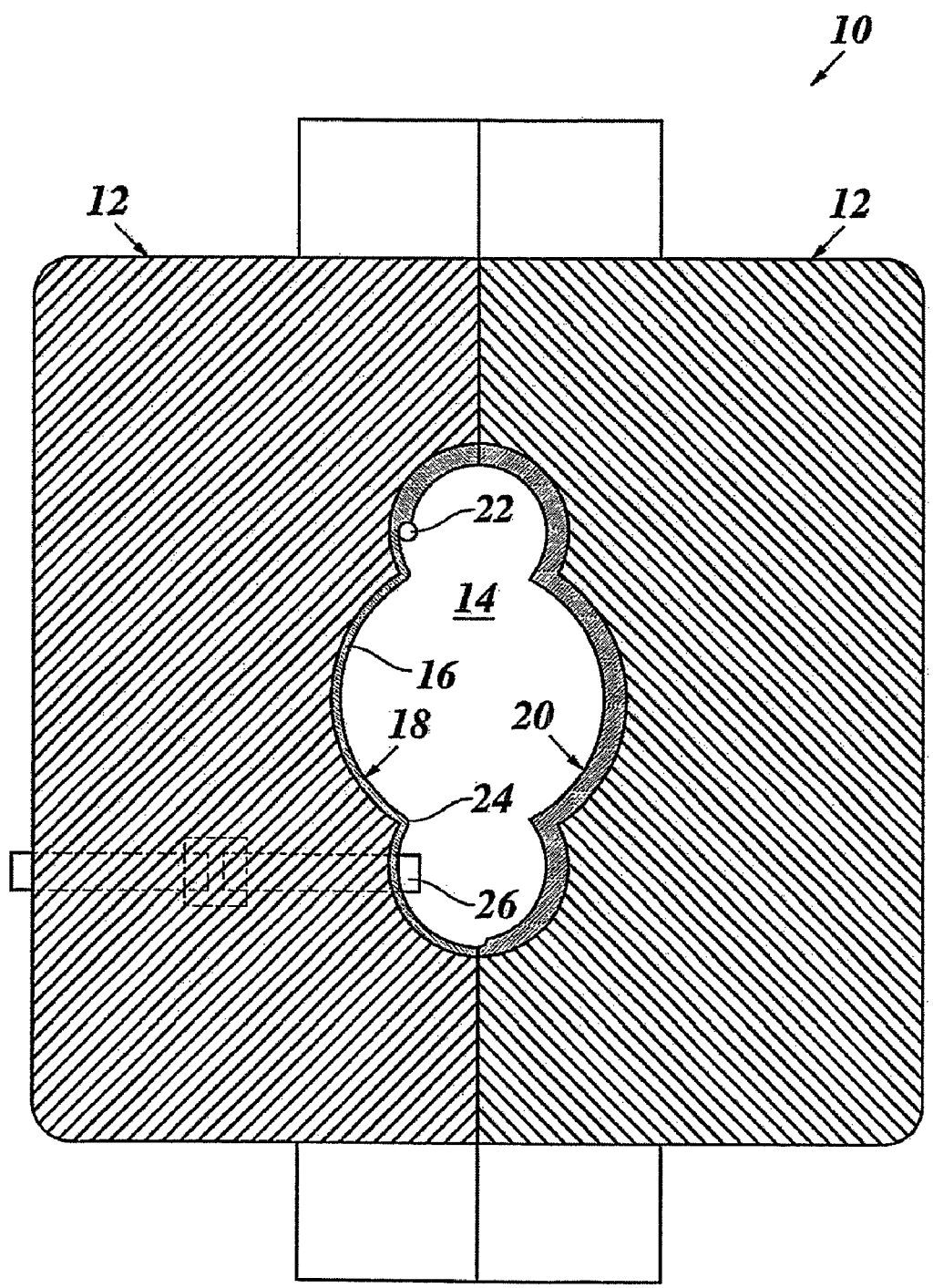
FIG. 3 is a schematic cross-sectional view of the housing shown FIG. 1 in an intermediate state during the execution of the method according to the invention.

In the cross-sectional view in FIG. 3 it can been seen that the internal wall of the fluid chamber 14 has a hardening layer 16. This hardening layer is for example formed by two complementary shells 18, 20 that are made of electrically conductive silicon carbide (e.g. CarSIK-NT of the company Schunk, Willich, Germany, specific resistance approximately 0.001 W·m), that are glued into the cut-out cavities of the half shells 12 by means of an electrically conductive glue, for example.

In the top portion of the shell 18 and in the shell 20, the hardening layer 16 still has a larger thickness. This thickness corresponds to the wall thickness of the shell that has originally been glued-in. In the example shown, the thickness of the hardening layer 16 is reduced to the finally desired value by means of wire EDM with a wire 22, and simultaneously the desired precise contour is given to the internal surface of the hardening layer. This machining step replaces the conventional step of mechanically grinding the hardening layer. By using electro-discharge machining (erosion), an improved accuracy can be achieved, which will eventually result in an improved efficiency of the machine.

In the example that has been shown here and in which the fluid chamber 12 has a uniform cross-section on its entire length, a wire EDM process using a wire 22 is convenient, wherein, as is shown in FIG. 1, the wire is held in a tensioned state so as to extend through the entire housing. The ends of the wire 22 may be held and guided in a known EDM apparatus in such a manner that they move on exactly circular arcs in order to obtain the desired cross-sectional shape of the fluid chamber 12 with three overlapping circles. Alternatively, any other contour with a cross-sectional shape that, in principle, is arbitrary may be formed, e.g. by means of a known CNC control.

During the EDM process, the edges 24 at the transitions between the different circular arcs are rounded to such an extent that, on the one hand, the risk of breakage is reduced and on the other hand the amount of leakage losses during operation of the machine is minimized.

In the example that has been shown here, the hardening layer 16 (the two shells 18, 20) consist of 92% silicon carbide and 8% conductive silicon carbide which confers the layer as a whole a sufficient conductivity for electro-discharge machining. At the same time, this material has the advantage that it has practically no shrinkage when the shells 18, 20 are sintered, so that the shells can be manufactured with high dimensional precision.

When the hardening layer is eroded only after the two half shells 12 have been joined, the advantage is that very smooth transitions are obtained at the joint between the shells 18, 20.

In another embodiment, it is also possible to form the entire hardening layer in one piece as a tubular shell which will then be sandwiched between the housing half shells when the latter are joined and which tubular shell will then be eroded.

For the purpose of wire EDM, preferably, several housings 10 are arranged with their axes oriented vertically in a two-dimensional raster on a bench of an EDM apparatus and are then eroded one after the other. When the erosion process for one housing has been completed, the wire 22 is automatically cut, and the erosion device moves on to the next housing and shoots-in a new wire, so that the erosion process can automatically be continued with the new housing. In this way, a rational mass production is possible.

Alternatively, other erosion processes, e.g. die sinking EDM, may be used for machining the hardening layers of fluid chambers having a cross-section that varies over the length and/or have spherically curved surface areas.

When no electrically conductive glue is used for gluing the hardening layer 16, the electrical contact that is necessary for electro-discharge machining of the hardening layer 16 may also be achieved by means of a clamping bow 26 which has been shown in FIGS. 1 and 3. Then, the clamping bow must possibly be relocated once during the erosion process in order to machine also those surface parts of the hardening layer 16 where the clamping bow had been positioned before. As an alternative, the clamping bow 26 is applied such that it engages only the end faces of the hardening layer 16 at the ends of the housing.

Figure 5:
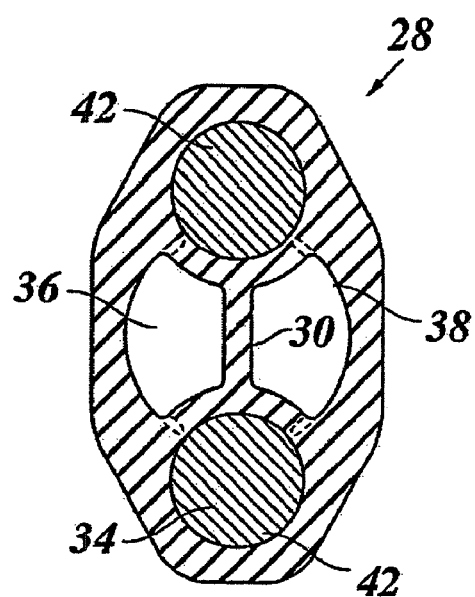
Figure 6:
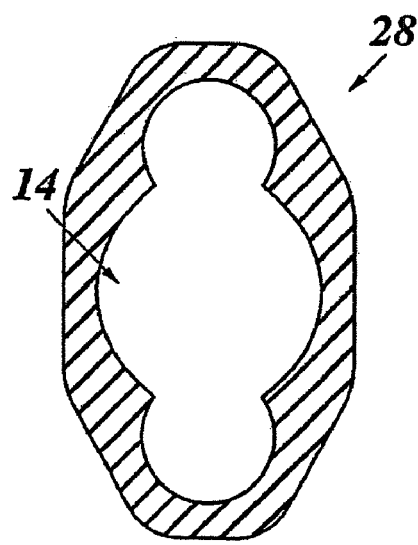

A modified method will now be explained with reference to FIGS. 4 to 6.

Figure 4:
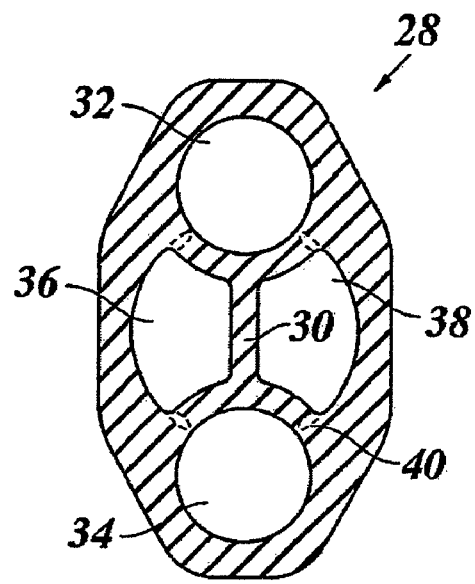
FIGS. 4-6 show different stages in the processing of an SiC shell according to a modified embodiment example.

FIG. 4 shows only a shell 28 which is made of conductive silicon carbide and is or will be inserted in a housing that has not been shown. The general shape of the shell 28 corresponds to the shape of the two joint shells 18, 20 in FIG. 3, except for the difference that a "cross" 30 has been left in the interior of what is to become the fluid chamber, said cross dividing the fluid chamber into four separate chambers 32, 34, 36 and 38. The chambers 32 and 34 have a circular cross-section, whereas the cross-sections of the chambers 36 and 38, together, form the central portion of the fluid chamber having the larger circular cross-section.

In the condition shown in FIG. 4, the surfaces of the chambers 32-38 have already been machined by EDM. Optionally, the webs of the cross 30, where they adjoin the external wall of the shell, may be weakened by recesses that may be formed in the same EDM step or in a separate EDM step. Then, the cross 30 is connected to the peripheral wall of the shell 28 only via rated break points 40 that will later facilitate the removal of the cross 30.

After the erosion step, machining tools 42 (FIG. 5) are inserted into the circular chambers 32 and 34, preferably simultaneously, and the internal surfaces of these chambers are mechanically finished by honing, lapping or the like. This has the advantage that, in these chambers, the depth of roughness of the surface can be reduced further. In a screw-spindle pump or a screw-spindle compressor, these chambers 32, 34 serve as bearings for the two outer spindles which are forced apart in opposite directions by the pressure of the fluid being pumped, so that particularly high frictional forces will occur in these bearings. Thus, by mechanically finishing just these chambers, a further reduction of wear can be achieved.

When the two chambers 32, 34 are simultaneously finished with the tools 42, the forces exerted by the tools 42 onto the cross 30 will cancel one another and will only result in a compressive load onto the vertical web of this cross but not to a bending strain on those parts that form the walls of the chambers 32, 34. The cross 30 may therefore be formed with relatively thin walls or may be weakened by the rated break points 40, as indicated in dashed lines. Optionally, however, the rated break points may be formed only after the mechanical finishing step.

When the mechanical finishing process has been completed, the cross 30 may be removed by mechanical impact or may be cut out by electro-discharge machining, so that one finally obtains the completed shell having the non-divided fluid chamber 14. Any possible burrs at the locations of the former rated break points may be removed in another finishing step, if necessary.

For manufacturing the shell 28 shown in FIG. 4, preferably, an electro discharge machining device is used with which the erosion wire may automatically be shot through the chambers 32-38 one after the other, so that the clamping of the workpiece need not be changed in-between. This assures a high dimensional accuracy during the electro-discharge machining.

The invention claimed is:

1. Method for manufacturing a machine housing having a fluid chamber with a hardening layer on an internal wall surface, comprising the steps of:
   making the hardening layer of a material, that, per-se, is not electrically conductive but has been made conductive by additive,
   forming the hardening layer by a shell having an interior of which is subdivided into at least two chambers having a circular cross section, an interior of the chambers being subdivided by a cross formed of the material of the shell,
   machining the surface of the hardening layer by electro-discharge machining,
   mechanically finishing internal surfaces of these chambers after said electro-discharge machining, and,
   then, removing the cross.

2. Method according to claim 1, further comprising the steps of:
   forming the hardening layer as a pre-prepared shell and
   adhesively fixing the hardening layer in a corresponding cavity of the machine housing where it is then machined by electro-discharge machining.

3. Method according to claim 2, wherein the step of adhesively fixing includes the step of fixing the hardening layer by an electrically conductive glue.

4. Method according to claim 1, wherein electrically conductive silicon carbide is used for the hardening layer.

5. Method according to claim 1, wherein the step of machining includes the step of machining of the hardening layer by wire electro-discharge machining.

6. Method according to claim 1, wherein the step of machining includes the step of machining the hardening layer by die sinking electro-discharge machining.

7. Method according to claim 1, further comprising the step of forming the machine housing of two half shells, each of which forms a part of the fluid chamber, and in that said electro-discharge machining is performed only after the half shells have been joined.

8. Method according to claim 1, further comprising the step of mechanically finishing the two chambers simultaneously.

9. Method according to claim 1, wherein the step of removing includes the step of separating the cross from the shell by breaking at rated break points.

10. Method according to claim 1, wherein the step of removing includes the step of separating the cross from the shell by electro-discharge machining.

* * * * *